US011653324B2

(12) United States Patent
Driscoll et al.

(10) Patent No.: US 11,653,324 B2
(45) Date of Patent: May 16, 2023

(54) USER SELECTABLE LOCATION GRANULARITY

(71) Applicant: Apple Inc., Cupertino, CA (US)

(72) Inventors: Adam M. Driscoll, Atherton, CA (US); Siraj T. Abidi, Santa Clara, CA (US); Jessica Aranda, Santa Clara, CA (US); Matthew B. Ball, Pacifica, CA (US); Krishna M. Behara, Cupertino, CA (US); Patrick L. Coffman, Cupertino, CA (US); Charles D. Deets, Cupertino, CA (US); Christopher C. Foster, San Jose, CA (US); Ronald K. Huang, Cupertino, CA (US); Erik C. Neuenschwander, Cupertino, CA (US); Stephen J. Rhee, San Jose, CA (US); Maria Ryen, San Jose, CA (US); Brandon J. Van Ryswyk, Cupertino, CA (US); Christian Schroeder, Cupertino, CA (US); Shuli Zhou, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/219,631

(22) Filed: Mar. 31, 2021

(65) Prior Publication Data

US 2021/0400624 A1 Dec. 23, 2021

Related U.S. Application Data

(60) Provisional application No. 63/041,799, filed on Jun. 19, 2020.

(51) Int. Cl.
*H04W 64/00* (2009.01)
*H04W 4/021* (2018.01)

(52) U.S. Cl.
CPC ........ *H04W 64/006* (2013.01); *H04W 4/021* (2013.01)

(58) Field of Classification Search
CPC ....... H04W 4/029; H04W 64/00; H04W 4/02; H04W 4/024; H04W 4/025; H04W 48/04; H04W 84/005; H04W 4/027; H04W 12/02; H04W 88/02; H04W 4/33
See application file for complete search history.

(56) References Cited

U.S. PATENT DOCUMENTS

| 2012/0220308 A1* | 8/2012 | Ledlie | H04W 4/029 |
| | | | 455/456.1 |
| 2016/0255497 A1* | 9/2016 | Pan | H04W 4/02 |
| | | | 455/410 |

\* cited by examiner

*Primary Examiner* — Kwasi Karikari
(74) *Attorney, Agent, or Firm* — BakerHostetler

(57) ABSTRACT

A location control subsystem is provided that allows a user of an electronic device to define the granularity used to provide location coarseness. A user can define a coarse location granularity for an application. When a coarse device location is reported to an application, the location can be provided with at least a minimum degree of variable specificity based on the selected location coarseness. When an application is granted a coarse location, the application is to interpret the provided location indicating that the user may be anywhere within a geographic region of variable specificity, as opposed to being close to a center point with a horizontal accuracy based on the precision of the location fix, as when a fine granularity location is provided. In addition to reducing the spatial resolution of the location that is reported to the application, the temporal resolution may also be reduced.

22 Claims, 14 Drawing Sheets

USER SELECTABLE LOCATION GRANULARITY

CROSS-REFERENCE

This application claims the benefit of priority of U.S. Provisional Application No. 63/041,799 filed Jun. 19, 2020 which is incorporated herein by reference.

FIELD

Embodiments described herein relate generally to a system and method of user selectable location granularity for location services.

BACKGROUND OF THE DESCRIPTION

Mobile devices can include location control subsystems in which one or more location determination techniques (e.g., Wi-Fi, Cellular, Satellite) are used to determine a location for the mobile device. The location control subsystem can gate application access to the location of the mobile device, such that a user may be required to provide explicit approval before an application is provided the location determined for the mobile device. Various location permission systems may be used to gate when an application can request the location of the mobile device. However, existing systems do not explicitly allow a user to limit the granularity of the location that will be provided to an application.

SUMMARY OF THE DESCRIPTION

Embodiments described herein techniques to enable user selectable location granularity for location services. An electronic device can be configured to enable a user to specify whether the application will receive the location estimate determined by a location services system of the electronic device or whether the application will receive an approximate location that has been modified by the location services system to reduce the precision of the location.

One embodiment provides for a data processing system on a mobile electronic device, the system comprising a display device to display a user interface, a location determination subsystem including a receiver for a satellite-based location estimation system, a memory device, and one or more processors coupled with the memory device, the location determination subsystem, and the display device. The one or more processors are configured to execute instructions. The instructions can cause the one or more processors to receive a location request from an application executed by the one or more processors, determine that the application is authorized to receive a location at a coarse location granularity, determine a location for the mobile electronic device, the location determine at least in part via a signal received via the receiver for the satellite-based location estimation system, adjust the location for the mobile electronic device to reduce the spatial resolution of the location, and provide the adjusted location to the application in response to the location request.

One embodiment provides a method comprising receiving, at a location determination subsystem of an electronic device, a location request from an application executed by one or more processors of the electronic device, determining that the application is authorized to receive a location at a coarse location granularity, and determining the location for the electronic device via a location determination system of the electronic device. The method additionally comprises adjusting the location for the electronic device to reduce a spatial resolution of the location, then providing an adjusted location to the application in response to the location request.

One embodiment provides a non-transitory machine readable storing instructions which, when executed by one or more processors of an electronic device, cause the one or more processors to perform operations comprising receiving, at a location determination subsystem of the electronic device, a location request from an application executed by one or more processors of the electronic device, determining that the application is authorized to receive a location at a coarse location granularity, and determining the location for the electronic device via a location determination system of the electronic device. The operations additionally comprise adjusting the location for the electronic device to reduce a spatial resolution of the location and providing an adjusted location to the application in response to the location request.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments described herein provide techniques to enable user selectable location granularity. Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

The terminology used in this description is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A portion of this disclosure contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. Copyright 2021 Apple Inc.

In the discussion that follows, a computing device that includes a touch-sensitive display is described. It should be understood, however, that the computing device may include one or more other physical user-interface devices. The various applications that may be executed on the device can use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

Figure 1:
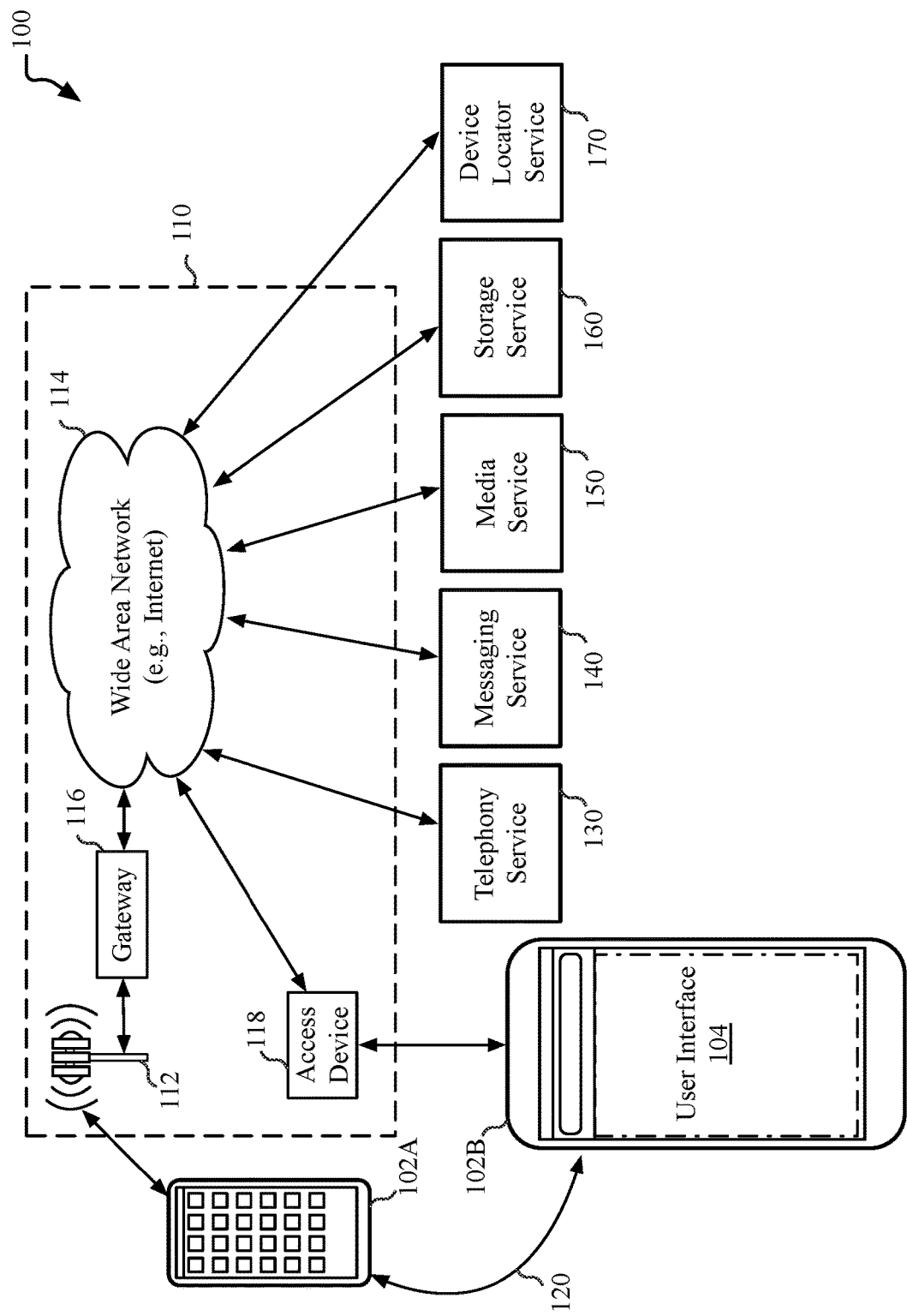
FIG. 1 is a block diagram of a network operating environment for mobile devices, according to an embodiment.

FIG. 1 is a block diagram of a network operating environment 100 for mobile devices, according to an embodiment. The network operating environment 100 includes multiple mobile devices, such as mobile device 102A and mobile device 102B. The mobile devices 102A-102B can each be any electronic device capable of communicating with a wireless network and one or more wireless accessory devices. Some example mobile devices include but are not limited to a smartphone, a tablet computer, a notebook computer, a wearable computer (e.g., smartwatch or other wearable computing accessory), a mobile media player, a personal digital assistant, and other similar devices. Each of mobile device 102A and mobile device 102B include a user interface, such as user interface 104 of mobile device 102B. Mobile device 102A and mobile device 102B can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102A can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP protocols). In some implementations, mobile device 102A can place and receive phone calls, send and receive e-mail messages, and retrieve electronic documents over the access device 118 and the wide area network 114. In some implementations, mobile device 102A or mobile device 102B can be physically connected to the access device 118 using one or more cables, for example, where the access device 118 is a personal computer. In this configuration, mobile device 102A or mobile device 102B can be referred to as a "tethered" device. In one embodiment, mobile device 102A can communicate with mobile device 102B via a wireless peer-to-peer connection 120. The wireless peer-to-peer connection 120 can be used to synchronize data between the devices.

Mobile device 102A or mobile device 102B can communicate with one or more services, such as a telephony service 130, a messaging service 140, a media service 150, a storage service 160, and a device locator service 170 over the one or more wired and/or wireless networks 110. For example, the telephony service 130 can enable telephonic communication between mobile device 102A and mobile device 102B, or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to mobile device 102A and mobile device 102B to store documents and media files.

The device locator service 170 can enable a user of mobile device 102A and mobile device 102B to determine the locations of those devices from other devices that are associated with the same account or family of cloud services accounts. Locations can be determined based on a satellite-based location service or terrestrial location service techniques in which a location of the device is estimated based on signals received from Wi-Fi or cellular base stations. Application access to satellite-based and terrestrial location services can be managed via location services logic described herein. Locations determined by the device can be shared with the device locator service 170 to enable a user to locate a lost or misplaced device that was, at least at some point, connected to the one or more wired and/or wireless networks 110.

Other services can also be provided, including a software update service to update operating system software or client software on the mobile devices. In one embodiment, the messaging service 140, media service 150, storage service 160, and device locator service 170 can each be associated with a cloud service provider, where the various services are facilitated via the cloud services account(s) associated with the mobile devices 102A-102B.

Since the advent of location-aware devices with the ability to determine a device location and track the device location over time, users have developed concerns about the use of their private location data by third parties. To address this concern, mobile device manufacturers have provided mechanisms for allowing users to opt out of sharing their location data with applications running on the mobile device. Additionally, location service authorization restrictions can be applied to applications. The location service authorization restrictions can be used to limit when an application can access a device location (e.g., One-Time, Always, While Using). However, it would also be beneficial if a user can also elect to limit the precision of location information that is provided to third parties. For example, a user may determine that an application should be allowed to have only a coarse grain location for the user. The user may also determine that the application can have a coarse grained location under some circumstances, but a fine-grained location under other circumstances.

When a coarse device location is reported to an application, the location can be provided with at least a minimum degree of variable specificity based on the selected location precision. When an application is granted a coarse (e.g., approximate) location, the application is to interpret the provided location indicating that the user may be anywhere within a geographic region of variable specificity, as opposed to being close to a center point with a horizontal accuracy based on the precision of the location fix, as when a fine granularity location is provided. The center point that is provided when a coarse granularity location is enabled may be based on a location other than the user's precise determined location. For example, the location can be provided with a center point that is the center point the geographic cell determined for a user. If providing the center point of the geographic cell is likely to create artificial location hotspots, such as in rural areas, an alternate location can be selected as the provided center point. For example, the central administrative building for the cell or supercell in which the user is located (e.g., City/Town Hall). Alternatively, a nearby landmark may be used. Locations at coarse granularity may be provided without regard to the technique or technology that is used to determine the location. Instead, the location that is determined for a mobile device may be modified before being provided to an application depending on the type of location that the application is configured to receive.

Additional features may be provided, such as reduced temporal resolution for coarse locations and a synchronized location determination cadence for coarse locations. Additionally, an application may be allowed to request a temporary increase in the location resolution for a period of time, where specific legitimate functionality of the application may warrant such increase.

When an application is installed, or at runtime when the application requests access to the location of the mobile device, access to the location can be granted with user selectable location granularity. A fine, or precise location can be provided to the application or a coarse location may be provided to the application. The location that is provided may be subject to other application location limitations. The fine or precise location is the location actually determined by the location determination mechanisms associated with the location subsystem of the mobile device. When a user has selected an alternate location granularity for an application, the location that is provided to the application will not be the location that is actually determined by the location determination mechanisms associated with the location subsystem of the mobile device. Instead, a different location is provided to the application that is derived based on the actual determined location.

The specific manner in which the location that is provided to the application is determined can vary. In one system, at least the geographic region in which the user resides is divided into grid cells. The specific size of the grid cells may vary. The grid cells may be fixed in size or may vary based on population density. The grid system may be uniform across users. Multiple grid cells may be grouped into a supercell. Each supercell has a representative point. For example, where a city may be divided into multiple grid cells, those grid cells may be associated with a supercell that encompasses the city. For very large cities, a supercell may not encompass the entire city and the city may have multiple supercells. Based on the location of the mobile device and the location granularity selected for the application, the location provided to the application may be the center of the grid in which the mobile device is located, the center of the supercell in which the mobile device is located, or a representative point of the supercell.

Consistent locations are provided to different applications that are configured to receive coarse locations and the coarse location updates that are sent to the applications can occur at a synchronized cadence. Coarse location update synchronization is performed to prevent different applications from the same developer from obtaining different location samples and correlating the samples to resolve a higher location resolution.

While applications will generally only receive locations at the user's specified location granularity, an application can request temporary escalation of location privileges. If the request is granted, the precision of upgraded for a period of time. The request may be explicitly or implicitly granted. For example, should the application initiate an attempt to perform a specific function that requires a precise location, the application may present a request via the user interface of the mobile device to explicitly request a temporary elevation to a precise location. As an additional example, a map application may be configured to receive a coarse location. However, the map application may also support a turn-by-turn navigation feature, which requires a more precise location to work properly. If the user enables the turn-by-turn navigation feature of the map application, the system may interpret such action as implicit permission to enable the provision of a precise location to the application. When the functionality that makes use of the elevated location precision ends, the application can return to receiving coarse locations. For example, when turn-by-turn navigation ends, the map application can return to receiving coarse locations.

In some configurations, coarse or fine locations may be provided for different usage modes. An application may be enabled to receive coarse locations while in use and no locations while in the background. An application may be configured to receive coarse locations while in the background and more precise locations while in use.

Coarse location updates may change how certain location services APIs work for an application. For example, if an application is configured to use a continuous location update API, the application will receive location updates at coarse temporal granularity and with large horizontal accuracy variance. Visit monitoring APIs may continue to report accurate arrival and departure times but will use a coarse location (e.g., arrived at grid, arrived at city/supercell). A significant location change API may be provided to enable an application to launch when a user travels a significant distance. When coarse location updates are enabled, the significant distance may be determined based on a number of grid cells or supercells that are traveled and may be triggered no more frequently than the coarse location update interval. Other location services APIs may not be available to an application that is configured to receive coarse locations. For example, location determination for beacon-based APIs may not be accessible to applications configured to receive coarse locations.

Figure 2:
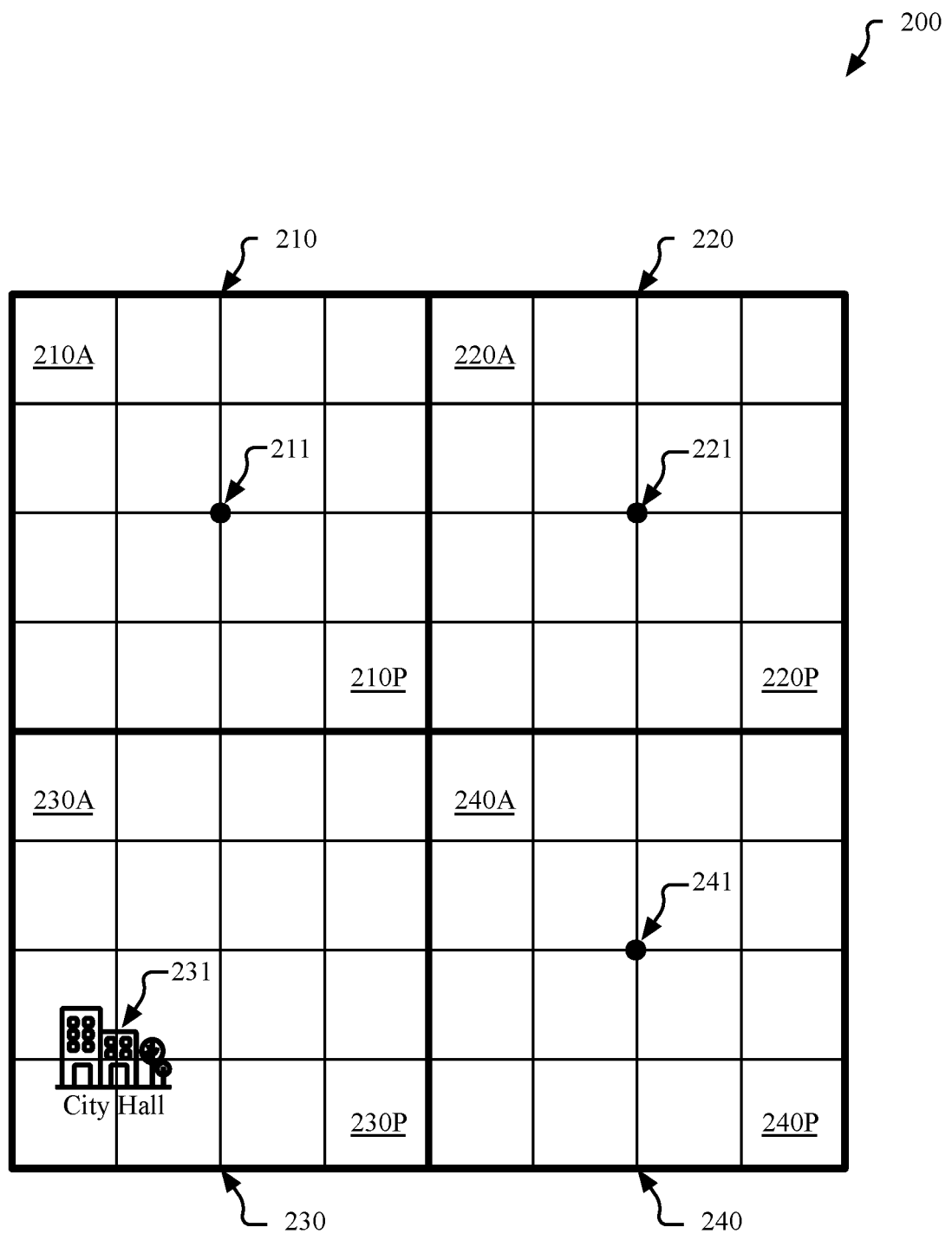
FIG. 2 illustrates a location and mapping system with support for coarse granularity location.

FIG. 2 illustrates a location and mapping system 200 with support for coarse granularity location. The system 200 can be used by mobile devices 102A-102B as in FIG. 1 (hereinafter, mobile device 102). The location and mapping system 200 can use a grid system that uses cells and supercells. For example, the location and mapping system can include multiple supercells 210, 220, 230, 240. The supercells can be divided into cells 210A-210P, 220A-220P, 230A-230P, 240A-240P. The number of supercells for a region and the number of cells within a supercell can vary. The specific size of the grid cells may vary. The grid cells may be fixed in size or may vary based on population density. The grid system may be uniform across users.

Where a city is divided into multiple grid cells, those grid cells may be associated with a supercell that encompasses the city. For example, supercell 230 may encompass a single city, with cells 230A-230P covering portions of the city. Based on the location of the mobile device and the location granularity selected for the application, the location provided to the application may be the center of the grid in which the mobile device is located, the center of the supercell in which the mobile device is located, or a representative point of the supercell. For example, where a user is determined to be within cell 210A, the coarse location center point may be specified as the center of cell 210A. The coarse location center point may also be specified as the point 211, which is the center of supercell 210. Supercell 220 may have center point 221. Supercell 240 may have center point 241. Center point 221 may be provided as the location of a user having a device that is located within supercell 220. Center point 241 may be provided as the location of supercell 240. In one embodiment, the center points 211, 221, 241 are determined based on map tile data for a location. In some embodiments and for some locations, the center point for a supercell may be determined mathematically using a pre-mapped coordinate system.

In one embodiment, a pre-determined reference point may be selected for a supercell. The pre-determined reference point can be a location that has been designated as a representative location for the geographic supercell. For example, instead of the center point of the supercell, a device located in supercell 230 may report a central administrative building (e.g., city hall 231) as the coarse location for the device. Where a pre-determined reference point is to be used for a supercell, map tile data within a supercell may be downloaded and analyzed to determine the coarse location to specify as the representative location.

Figure 3:
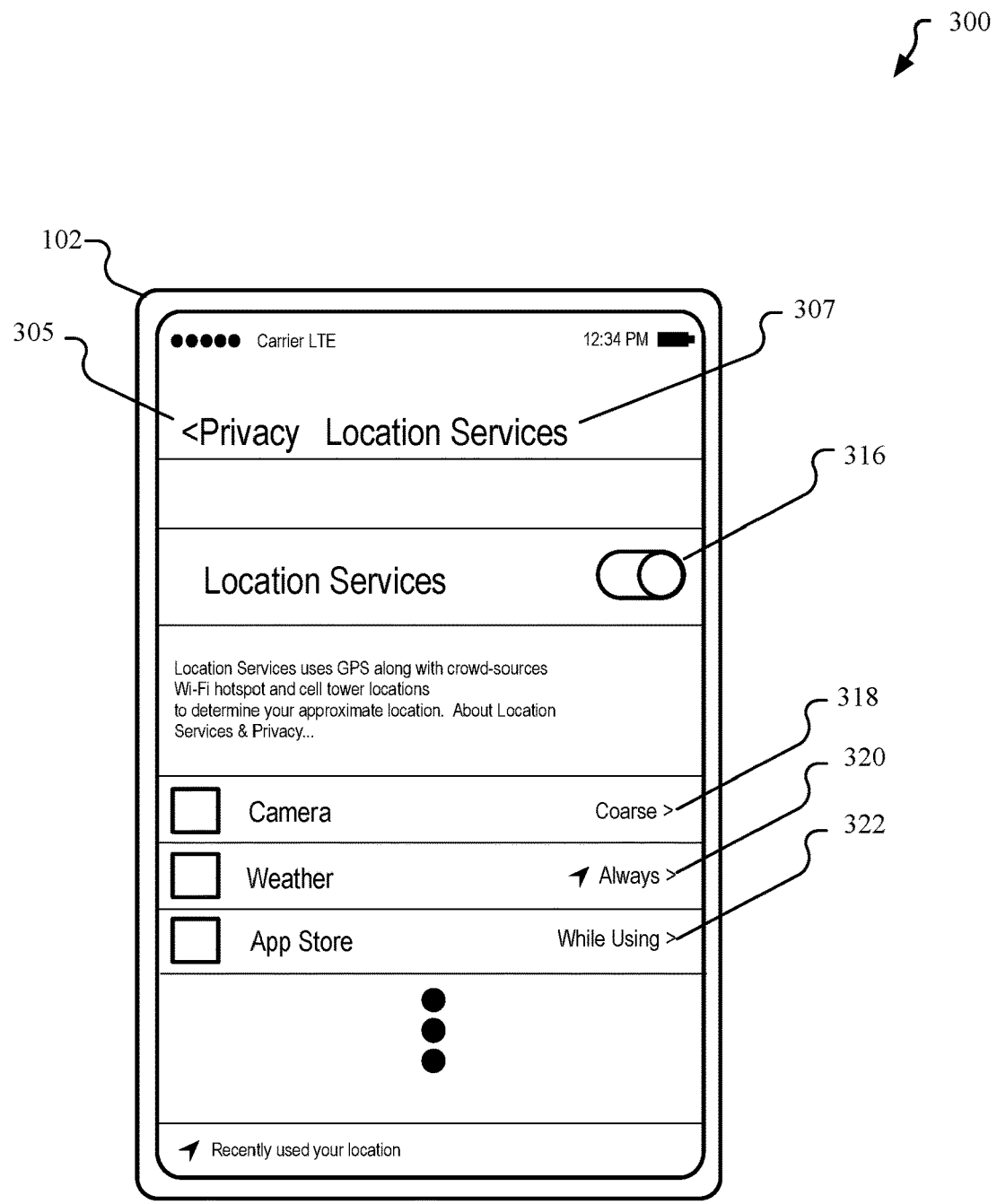
FIG. 3 illustrates an exemplary settings interface that enables specification of a coarse location service authorization type for an application.

In one embodiment,

FIG. 3 illustrates an exemplary settings interface 300 that enables specification of a coarse location service authorization type for an application. In one embodiment, a user can specify a location service authorization type using a location services interface 307 that is a sub-interface of a privacy settings interface 305. The location services interface 307 can provide a user interface element 316 to enables the user to turn off location service for all applications. The location services interface 307 can also include interface elements 318, 320, and 322 corresponding to the camera, weather, and app store applications, respectively. The per-app settings allow the user to specify location services authorization types, such as, but not limited to Always and While Using. Always authorization allows the app to use location services even when the application is in the background. While Using allows the application to use location services only when the application is the foreground application. The user may use interface elements 318, 320, and 322 to change the location service authorization type granted by the user if a different location service authorization type was granted. If an application recently used location services, an indicator may be presented next to the location services authorization type to indicate that the application recently used the location determined for the mobile device 102.

A location granularity may also be configured for an application. In one embodiment, a coarse location setting can be used as a location service authorization type instead of Always or While Using, as indicated with respect to interface element 318 for the camera application. In one embodiment, the coarse location setting can be specified in addition to the location services authorization type. For example, an application may be configured to receive a location only while in use and the location that will be provided will be a coarse location. Such application will not be able to receive any location information while in the background. In one embodiment an application may be configured to receive a coarse location while in the background and a fine location when in use.

Figure 4:
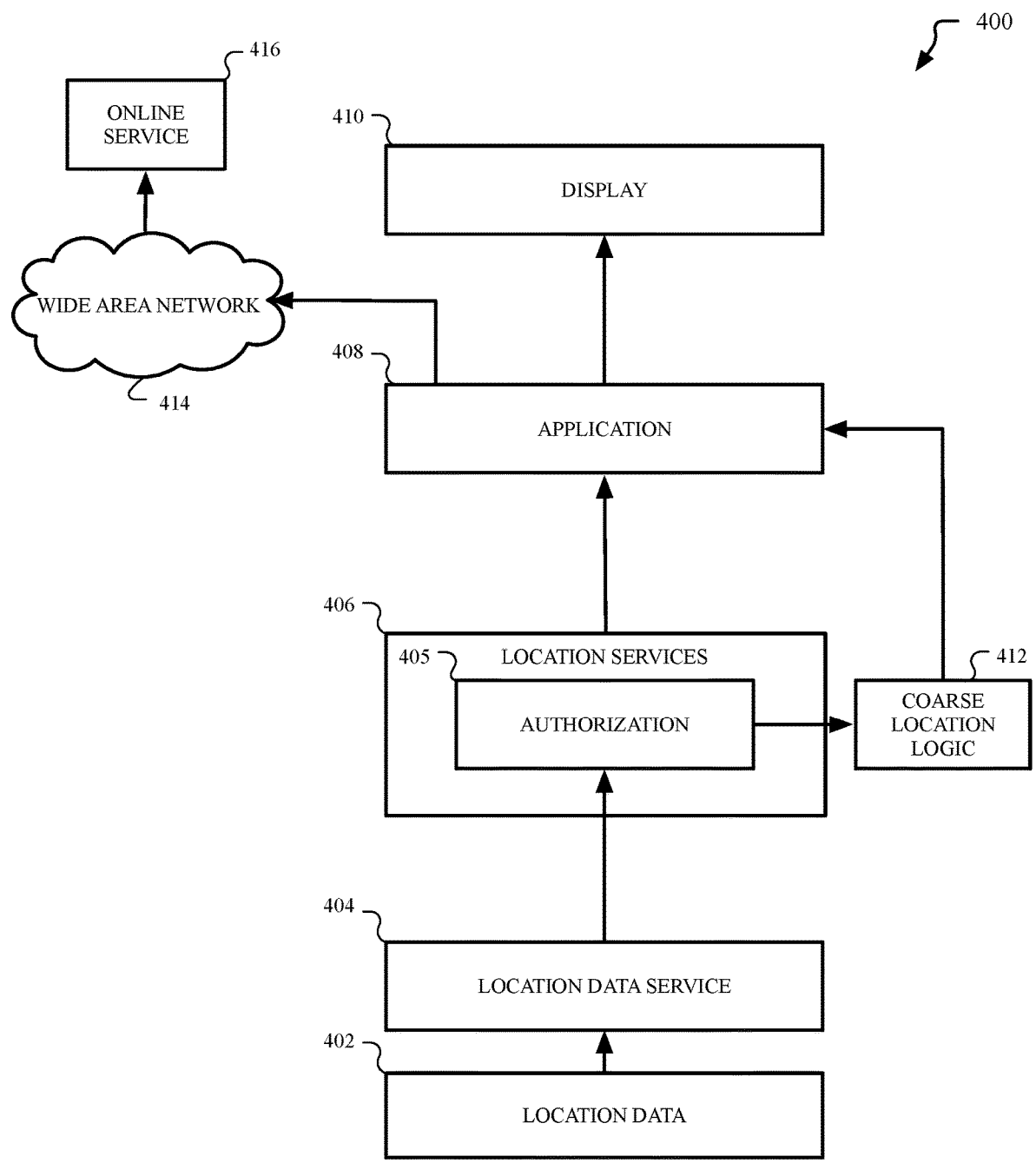
FIG. 4 illustrates a system for location service authorization and indication with support for a coarse location service authorization.

FIG. 4 illustrates a system 400 for location service authorization and indication with support for a coarse location service authorization. In one embodiment, system 400 is implemented by a software stack installed on a mobile device, such as mobile device 102. Location data 402 is collected by a location service 404, which provides the location data 402 to an application 408 based on the location service authorization type that is currently enforced by an authorization module 405, which can be included in location services module 406. Location data 402 can be provided by one or more position systems of mobile device 102 including satellite-based positioning systems (e.g., GPS) and wireless radio and/or wireless network-based positioning systems that estimate the location of the mobile device 102 based on the wireless base stations that are within range of the device.

If an Always authorization type is enforced by authorization module 405, location data 402 is provided by location service 404 to application 408 when application 408 is running in the foreground or background on mobile device 102. Application 408 may send location data 402 to an online service 416 through a wide area network 414 (e.g., the Internet). The online service 416 may be a third-party service associated with application 408.

If a While Using authorization type is enforced by authorization module 405, when application 408 is in use (e.g., its GUI is displayed on a display 410), then location service 404 can send location data 402 directly to application 408, where it can be displayed to user via the display 410. If application 408 is not in use, the location data may be withheld from application 408 until application 408 returns to use as the foreground application of the mobile device 102.

As a separate authorization type or conjunction with another authorization type, a coarse location authorization determined for application 408 by authorization module 405 cause the location data 402 to be processed by coarse location logic 412. The coarse location logic 412 can determine a coarse or approximate location to provide to the application based on the precise location determined for the mobile device 102. For example, a center point of a cell or supercell in which the device is located can be substituted for the location specified by the location data 402. Alternatively, a landmark within the cell or supercell can be provided.

While applications will generally only receive locations at the user's specified location granularity, an application can request temporary escalation of location privileges. If the request is granted, the precision of upgraded for a period of time. The request may be explicitly or implicitly granted. For example, should the application initiate an attempt to perform a specific function that requires a precise location, the application may present a request via the user interface of the mobile device to explicitly request a temporary elevation to a precise location. As an additional example, a map application may be configured to receive a coarse location. However, the map application may also support a turn-by-turn navigation feature, which requires a more precise location to work properly. If the user enables the turn-by-turn navigation feature of the map application, the system may interpret such action as implicit permission to enable the provision of a precise location to the application. When the functionality that makes use of the elevated location precision ends, the application can return to receiving coarse locations. For example, when turn-by-turn navigation ends, the map application can return to receiving coarse locations.

Figure 5A:
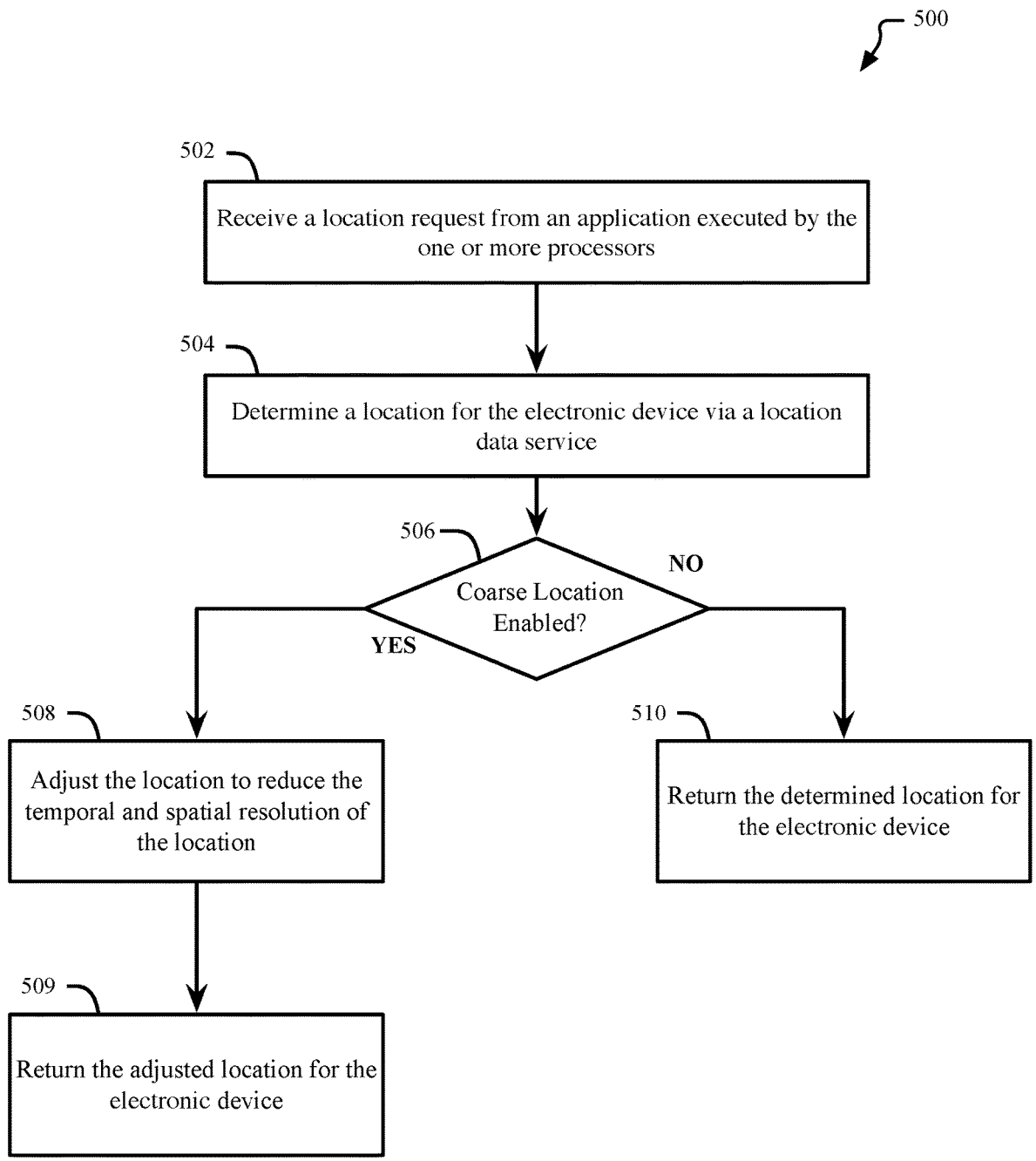
FIG. 5A-5B are flow diagrams illustrating methods of providing a device location based on a location service authorization type.
Figure 5B:
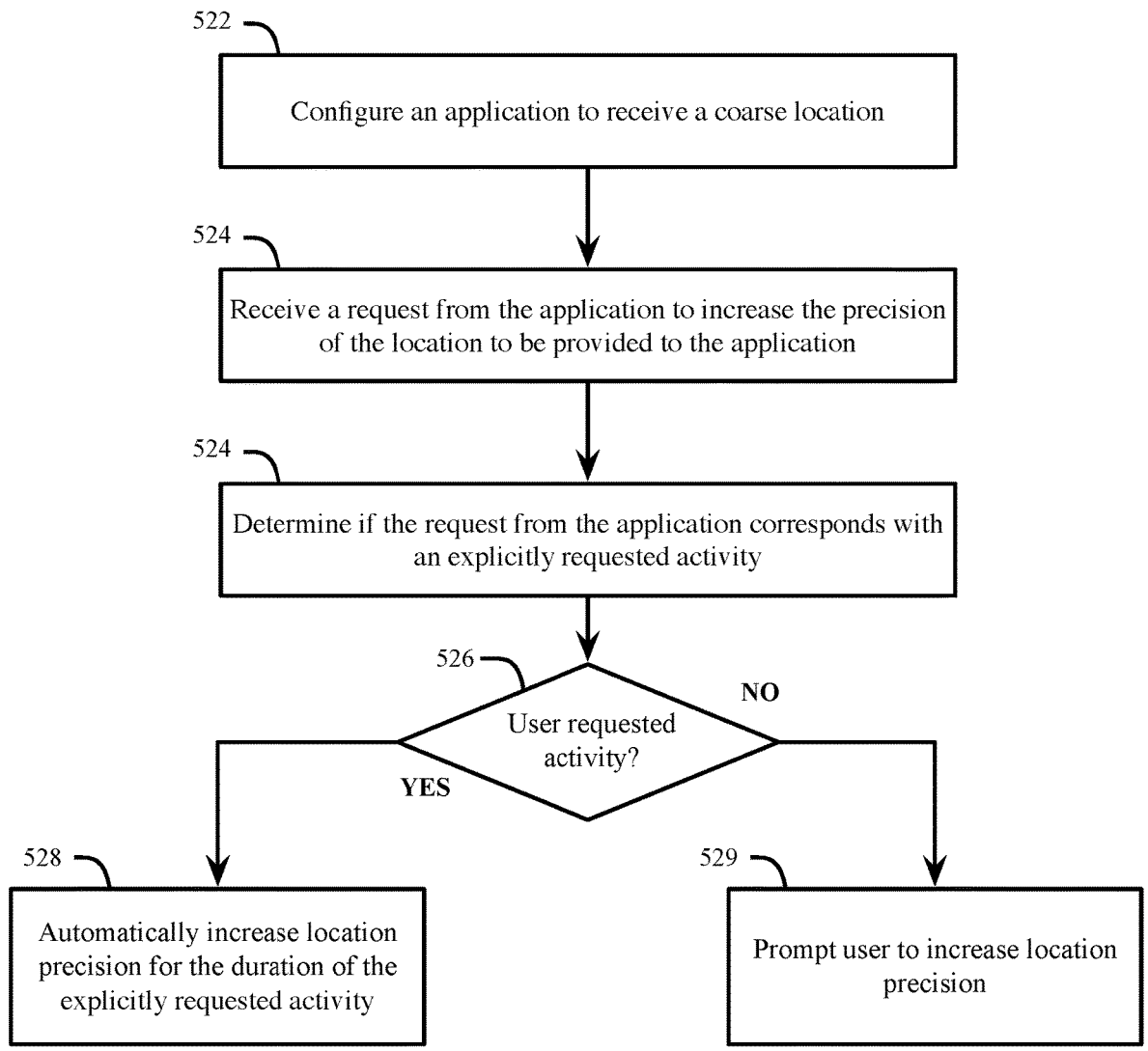

FIG. 5A-5B are flow diagrams illustrating methods 500, 520 of providing a device location based on a location service authorization type. The methods 500, 520 can be performed by a mobile device 102 or any other electronic device as described herein that is configurable to provide a coarse location to an application. For example, the methods 500, 520 can be implemented by logic of system 400 of FIG. 4. FIG. 5A illustrates a method 500 of providing a device location according to a specified location service authorization type. FIG. 5B illustrates a method 520 of requesting an increase in the resolution of a location provided to an application.

With reference to FIG. 5A and in accordance with method 500, location service logic of an electronic device (e.g., location services module 406 of FIG. 4) can receive a location request from an application executed by one or more processors of the electronic device (502). The electronic device can then determine a location for the electronic device via location data service (504). The location data service can be a framework on the electronic device that works in conjunction with one or more of location estimation and/or determination systems described herein, including satellite-based and/or terrestrial location service techniques. The electronic device can then determine if a coarse (e.g., approximate) location is enabled for the application (506). If a coarse location is not enabled for the application ("no", 506), the electronic device can return the determined location for the electronic device (510). If a coarse location is enabled for the application ("yes", 506), the electronic device can adjust the location to reduce the temporal and/or spatial resolution of the location (508). The electronic device can then return the adjusted location for the electronic device (509).

The location adjustment can go beyond any adjustments that may be made to compensate for errors inherent to various location determination systems. The location adjustment is also distinct from any adjustment made based on an accuracy metric of the location determination system or systems in use. The location adjustment is also distinct from the ambiguity of location that may be present when some terrestrial location determination services are in use. Instead, based on a determination or estimation that the electronic device is located at a first location, a second location can be provided to the application that is a coarse generalization of the determined location. The second location can be, for example, the center of a geographic grid cell associated with the location determined for the electronic device. The second location can also be the center of a geographic grid supercell associated with the determined location of the electronic device. The second location can also be a location of the geographic supercell that is pre-determined to be representative of the geographic supercell, such as but not limited to a town center or city hall.

The location adjustment can also be an adjustment in the temporal resolution for the location, such that a coarse location that is provided to an application is updated less frequently than a fine-grained location that would otherwise be provided. For example, the location data service framework of the electronic device can store and/or cache coarse locations for the device separately from the fine-grained location that is determined for the device. The fine-grained location can be updated in real-time by the electronic device, while the coarse locations can be updated at a pre-determined cadence based on the fine-grain location that is stored at the time of the update. The same coarse location can be provided to all applications that are configured to receive coarse locations. In embodiments in which multiple levels of coarse granularity may be configured for an application, the same coarse location is provided to all applications that are configured to the same level of coarse granularity.

Additionally, location update events that are sent to applications configured to receive coarse locations may be sent in a synchronized cadence, and a minimum amount of time may be required to have passed before the triggering of a previous location update event. Where an application is registered to receive updates based on a significant change in a user location, the significant change update events may be sent in response to significantly larger changes in location than when fine-grained location is enabled for the application. For example, a significant location change update for an application configured to access a fine-grained location may be sent in response to a change of 500 meters, while a significant location change update for applications configured for a coarse-grain location may occur in response to a change of several kilometers, a move between cities, and/or a change in a cell or supercell of a map grid.

Scenarios may also exist in which an application that is configured for a coarse location can be temporarily updated to a fine-grained location to perform certain functionality. If an application will perform an activity that may require the ability to access a fine-grained location, the application can request an increase in the precision of the location to be provided for the application. The electronic device can present a prompt to enable the request to be approved or denied. If an application is to perform the activity in response to user input, the application may be granted automatic access to a fine-grained location for a limited time and/or until conclusion of the activity requested by the user. For example, a mapping application that is configured to generally have access only to a coarse location can be configured to provide a fine-grained location when turn-by-turn navigation functionality is enabled by a user. The mapping application can then return to receiving a coarse location when turn-by-turn navigation is completed or terminated.

With reference to FIG. 5B and in accordance with method 520, location service logic of an electronic device (e.g., location services module 406 of FIG. 4) such as logic within a location services subsystem of the electronic device, can configure an application to receive a coarse location or approximate location (522). The logic can then receive a request from the application to increase the precision of the location to be provided to the application (524). In response to the request, the logic can determine if the request from the application corresponds with an explicitly requested activity (526). An explicitly requested activity, in one embodiment, includes activities that are initiated in response to input that is physically received via a input device. Such input may be interpreted as implicit permission from the user to enable the provision of a precise location to the application. For example, initiating turn-by-turn navigation on a map application can be considered implicit permission to enable a precise location for the application. If the logic determines the request corresponds with a user requested activity ("yes", 526), the logic can automatically increase the precision of the location that is provided to the application for at least the duration of the explicitly requested activity (528). If the logic determines that the request does not correspond with a user requested activity ("no", 526), the logic can prompt the user to increase the location precision (529). If the user approves of the increase in location precision, a more precise location can be provided to the application. If the user denies the increase in location precision, a coarse or approximate location will continue to be provided to the application.

Figure 6A:
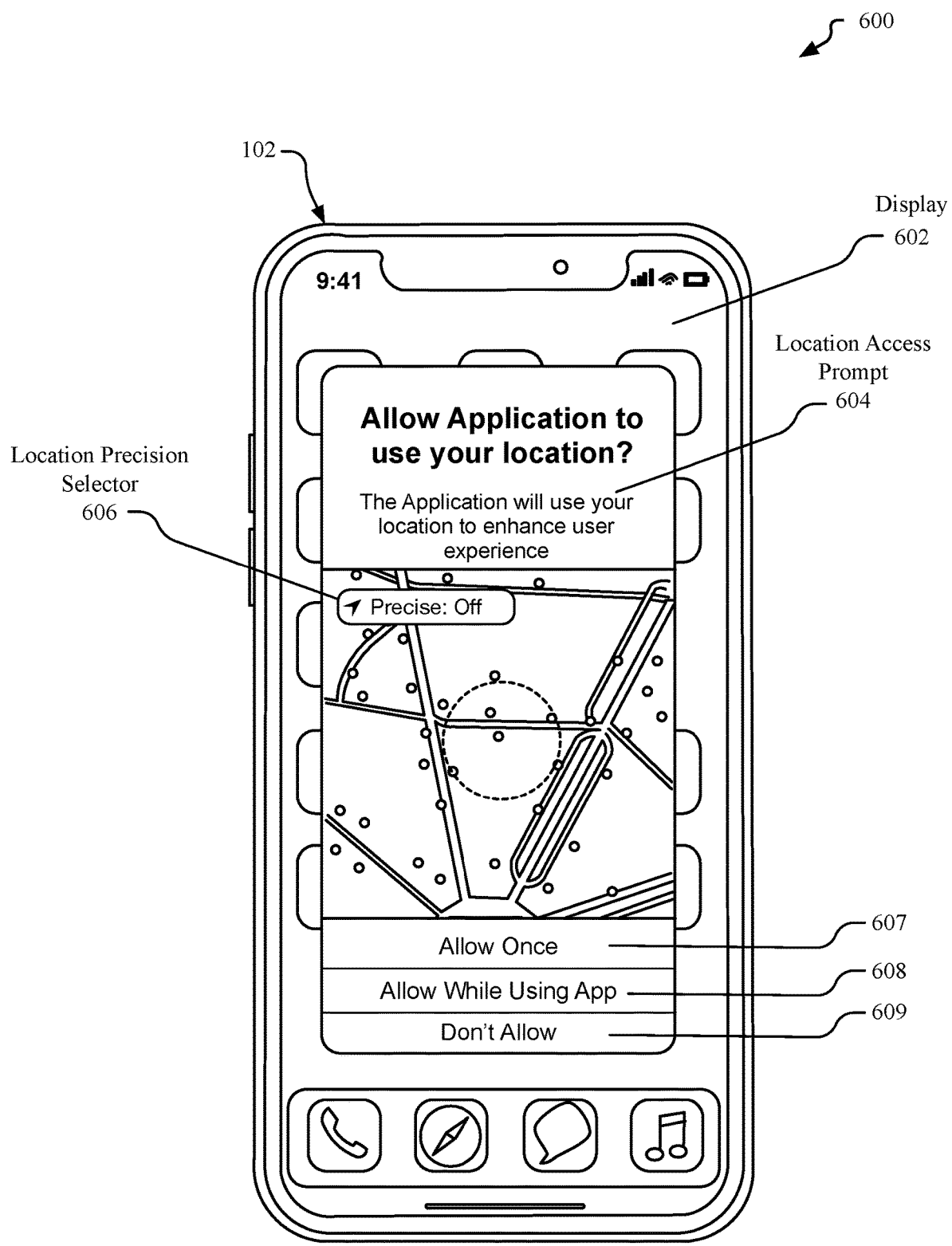
FIG. 6A-6B illustrate user interfaces to select or adjust a location precision for an application.
Figure 6B:
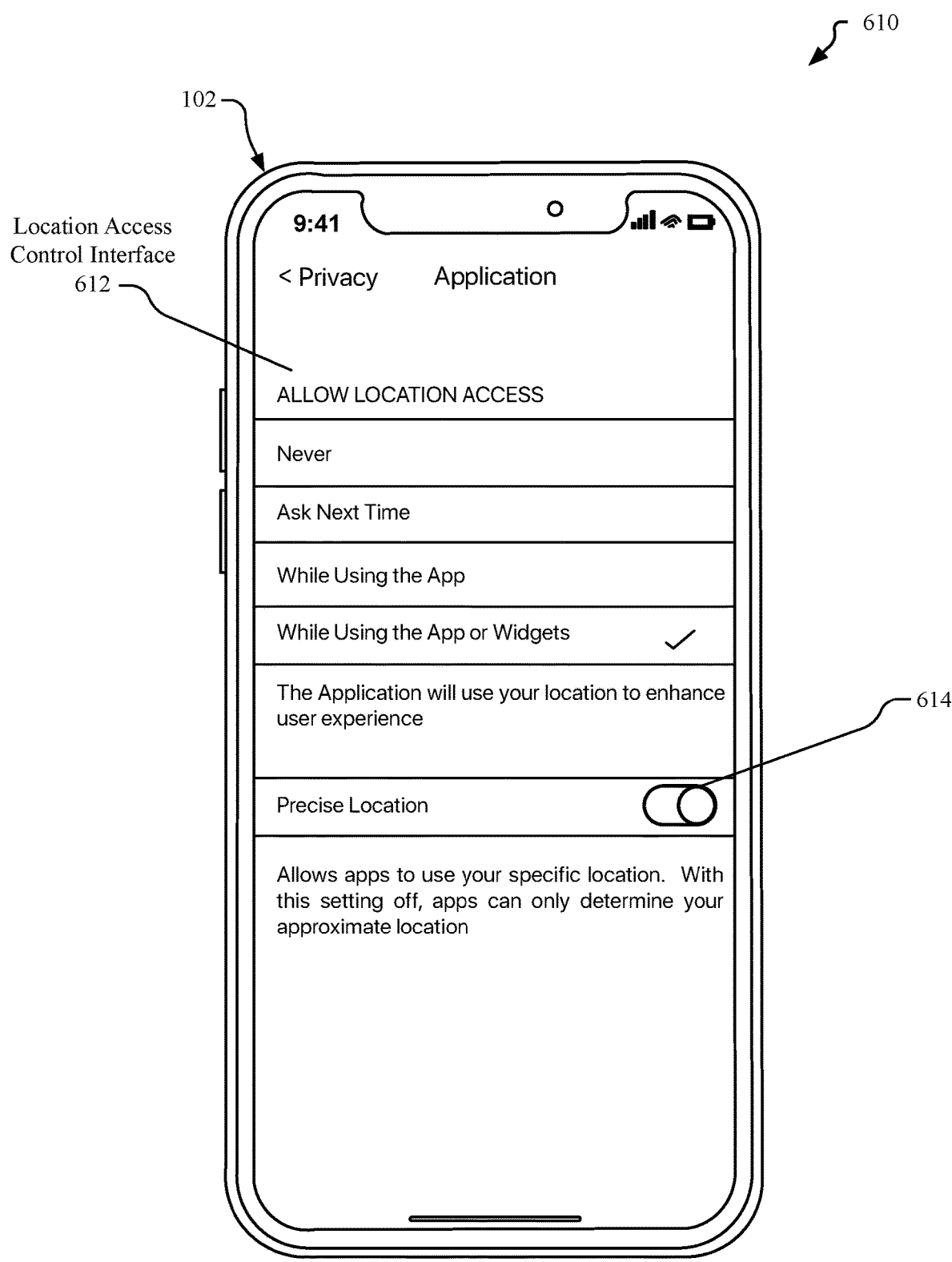

FIG. 6A-6B illustrate user interfaces 600, 610 to select or adjust a location precision for an application. FIG. 6A illustrates a user interface 600 that displays a prompt having an interface element to select location granularity for an application in conjunction. FIG. 6B illustrates a user interface 610 that displays a settings page for application location settings.

With reference to FIG. 6A, user interface 600 is displayed via a display 602 of mobile device 102, where the display 602 can be a touch-sensitive display. User interface 600 includes a location access prompt 604 that may be presented when an application is to perform an action that will make use of a location estimate for the mobile device 102. The location access prompt 604 can be presented by location services logic (e.g., location services module 406) of the operating system of the mobile device 102 in response to a request from an application to access location data for the mobile device 102. In one embodiment the location access prompt 604 includes an interface element that provides a location precision selector 606. The location precision selector 606 enables a user to toggle between or select one of between the multiple location precisions that can be presented to the application. In one embodiment, the available locations include a precise (e.g., fine-grained) location and an approximate (e.g., coarse-grained) location, although additional levels of precision may be available in other embodiments (e.g., neighborhood, city, county, state, nation).

The location precision selector 606 additionally includes interface elements to enable a user to specify when the application can access the location. In one embodiment, the location precision selector presents a user interface element that can be selected to allow one time access to a location 607, access while the application is in use 608, or deny access 609. In one embodiment, interface elements to enable other access permissions may be presented, such as an interface element to enable the application to access the location of the mobile device 102 while the application is in a background state.

With reference to FIG. 6B, in one embodiment the mobile device 102 can present a location access control interface 612 that enables a user to adjust the location permissions that are configured for a device. In one embodiment the location control interface 612 is a user privacy control that may be accessed for an application via the location services interface 307 of FIG. 3 by selecting an application for which location access control is to be adjusted. Via the location access control interface 612, a user can adjust the location access control permissions that were previously granted to an application. The location access control interface 612 can include an interface element to configure an accuracy of the location that is provided to the application. In one embodiment, an interface element 614 is presented that enables the presentation of the precise location of the mobile device 102 to the application. When the interface element 614 is set to a position that enables the precise location, the application will receive the precise location of the device as determined by the location services subsystem of the mobile device 102. When the interface element 614 is set to a position that disables the precise location, a coarse-grained and/or approximate location is provided to the application. For embodiments in which multiple levels of coarse granularity may be configured, the location access control interface 612 may be configured to enable selection between the multiple levels.

In one embodiment, configuring an application to receive coarse location updates can change how certain location services APIs work for an application. For example, if an application is configured to use a continuous location update API, the application will receive location updates at coarse temporal granularity and with large horizontal accuracy variance. Visit monitoring APIs can continue to report accurate arrival and departure times but will use a coarse location (e.g., arrived at grid, arrived at city/supercell). A significant location change API may be provided to enable an application to launch when a user travels a significant distance. When coarse location updates are enabled, the significant distance may be determined based on a number of grid cells or supercells that are traveled and may be triggered no more frequently than the coarse location update interval.

Figure 7:
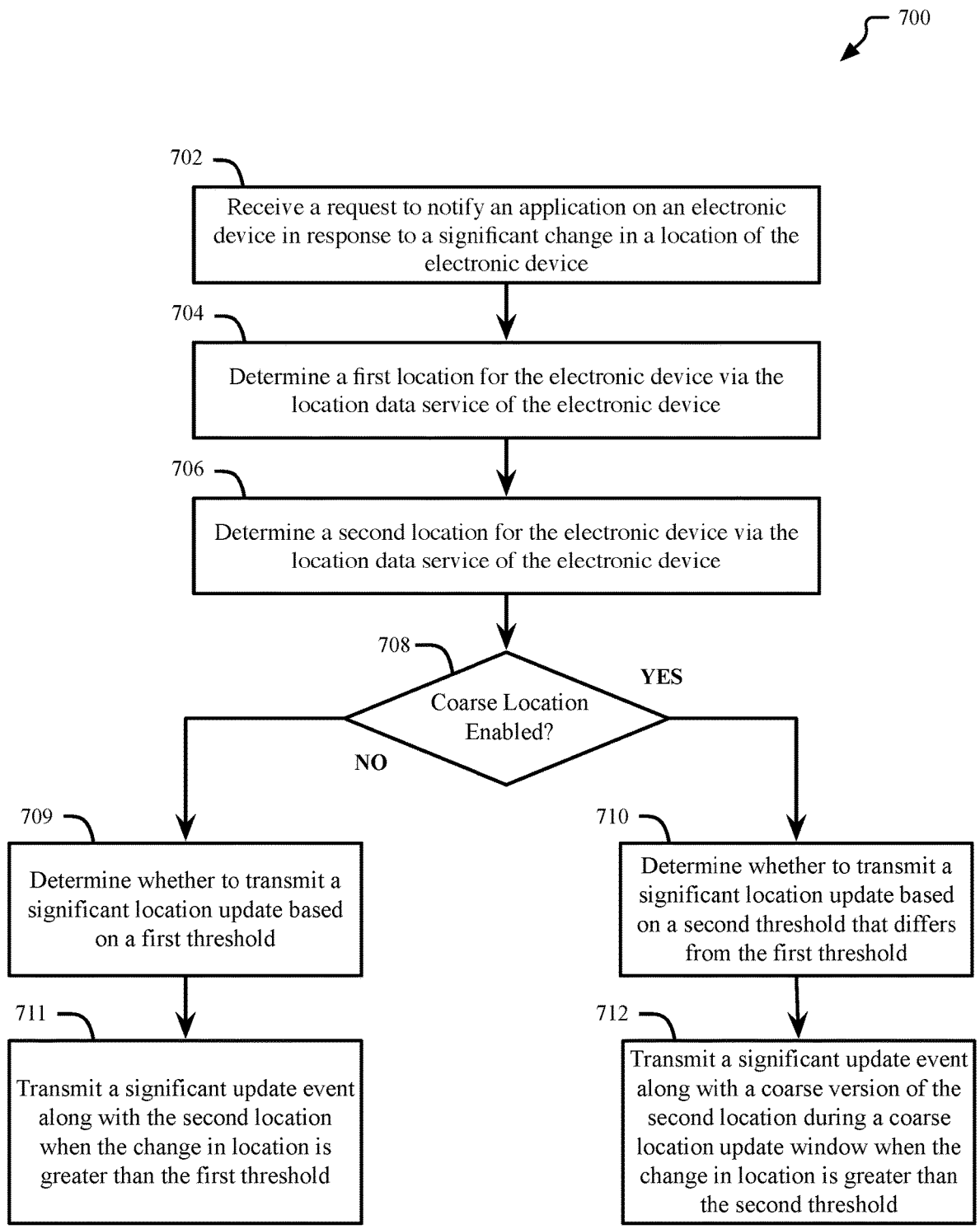
FIG. 7 illustrates a method of providing a coarse location update to an application on an electronic device.

FIG. 7 illustrates a method 700 of providing a coarse location update to an application on an electronic device. According to method 700, in one embodiment location service logic on an electronic device (e.g., location services module 406 of FIG. 4) can receive a request to notify an application on an electronic device in response to a significant change in a location of the electronic device (702). The request can be received in the form of an API call to begin the monitoring of significant location changes. When an application begins monitoring, the location service logic on the electronic device can send the application a location update event when a significant change in the location of the electronic device is detected. To determine when a significant change in location has occurred, the electronic device can determine a first location for the electronic device via the location data service of the electronic device (704). The electronic device can then determine a second location for the electronic device via the location data service of the electronic device (706).

The location data service can then determine whether a coarse (e.g., approximate) location is enabled for the application (708). When the application is configured for a precise location ("no", 708), the location control logic can determine whether to transmit a significant location update based on a first threshold (709). The location control logic can then transmit a significant update event along with the second location when the change in location is greater than the first threshold (711). When the application is configured for a coarse location ("yes", 708), the location control logic can determine whether to transmit a significant location update based on a second threshold that differs from the first threshold (710). The location control logic can then transmit a significant update event along with a coarse version of the second location during a coarse location update window when the change in location is greater than the second threshold (712). The second threshold may be associated with a larger change in distance relative to the first threshold. In one embodiment, the second threshold may be based on a change in a number of geographic grid cells or supercells. The coarse location update window limits the frequency in which coarse location updates are given to an application to the coarse location update interval that is configured for those applications.

In addition the significant location change API, other location APIs are adjusted when coarse location updates are configured for an application. In one embodiment, the location services logic provides a visits location service that can provide a location update event to an application when the electronic device dwells at a location for a period of time. When coarse location updates are configured for an application, the coarse locations are provided with the location updates instead of the precise location in which the electronic device dwelled.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing implementing components may in some cases be embodied at least in part in firmware, microcode, or other hardware embedded logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g., the provider of a software library) or creator of the another set of APIs.

Figure 8:
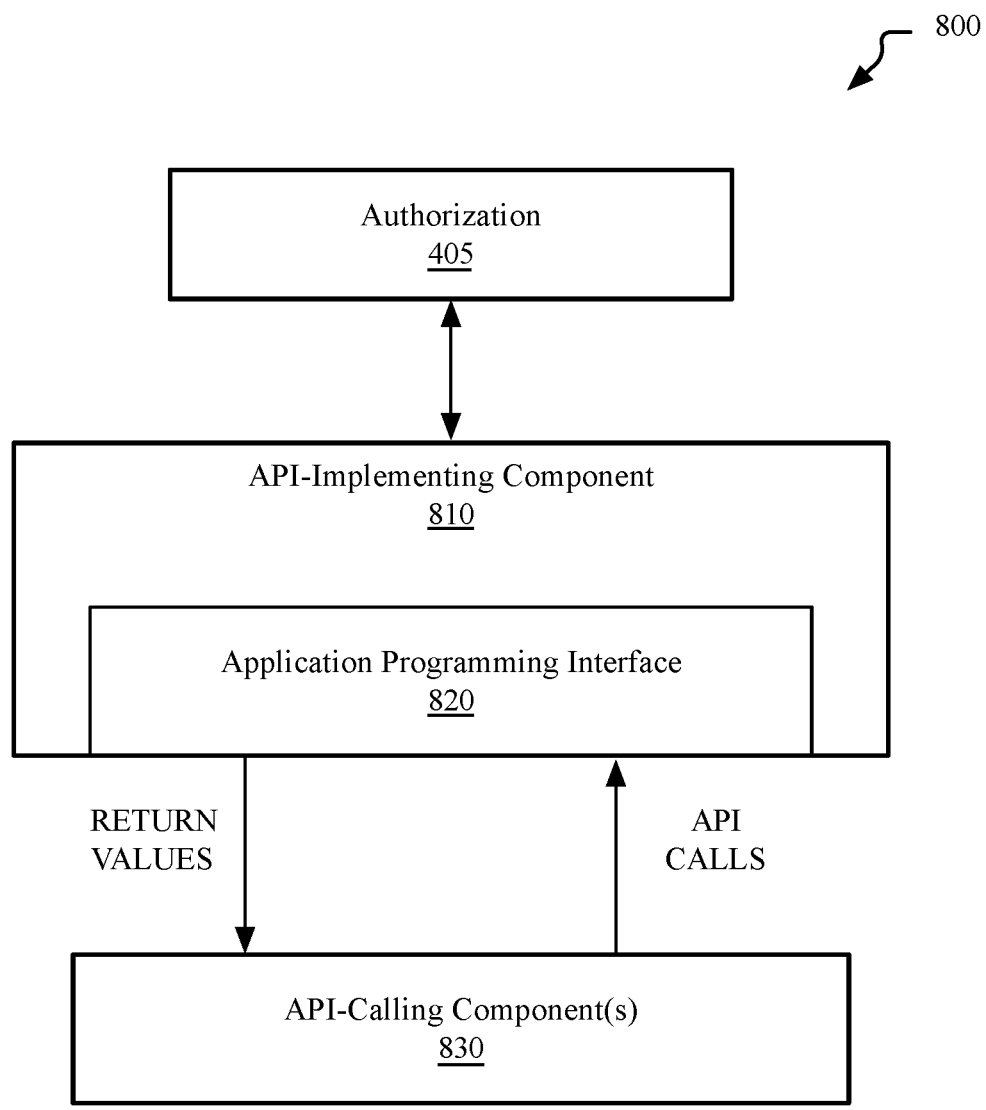
FIG. 8 is a block diagram illustrating an exemplary API architecture, which may be used in some embodiments.

FIG. 8 is a block diagram illustrating an exemplary API architecture, which may be used in some embodiments of the invention. As shown in FIG. 8, the API architecture 800 includes the API-implementing component 810 (e.g., an operating system, a library, a device driver, an API, an application program, software or other module) that implements the API 820. The API 820 specifies one or more functions, methods, classes, objects, protocols, data structures, formats and/or other features of the API-implementing component that may be used by the API-calling component 830. The API 820 can specify at least one calling convention that specifies how a function in the API-implementing component receives parameters from the API-calling component and how the function returns a result to the API-calling component. The API-calling component 830 (e.g., an operating system, a library, a device driver, an API, an application program, software or other module), makes API calls through the API 820 to access and use the features of the API-implementing component 810 that are specified by the API 820. The API-implementing component 810 may return a value through the API 820 to the API-calling component 830 in response to an API call.

It will be appreciated that the API-implementing component 810 may include additional functions, methods, classes, data structures, and/or other features that are not specified through the API 820 and are not available to the API-calling component 830. It should be understood that the API-calling component 830 may be on the same system as the API-implementing component 810 or may be located remotely and accesses the API-implementing component 810 using the API 820 over a network. While FIG. 8 illustrates a single API-calling component 830 interacting with the API 820, it should be understood that other API-calling components, which may be written in different languages (or the same language) than the API-calling component 830, may use the API 820.

The API-implementing component 810, the API 820, and the API-calling component 830 may be stored in a machine-readable storage medium, which includes any mechanism for storing information in a form readable by a machine (e.g., a computer or other data processing system). For example, a machine-readable medium includes magnetic disks, optical disks, random-access memory; read only memory, flash memory devices, etc.

In one embodiment, the authorization module 405 described herein can be communicatively coupled with the API-implementing component 810 to mediate access to privacy related system resources such as the user data and system resources illustrated in FIG. 2. Before the API-implementing component 810 can perform some operations, the API implementing component 810 can communicate with the authorization module 405 to determine if such operations can be performed.

Figure 9A:
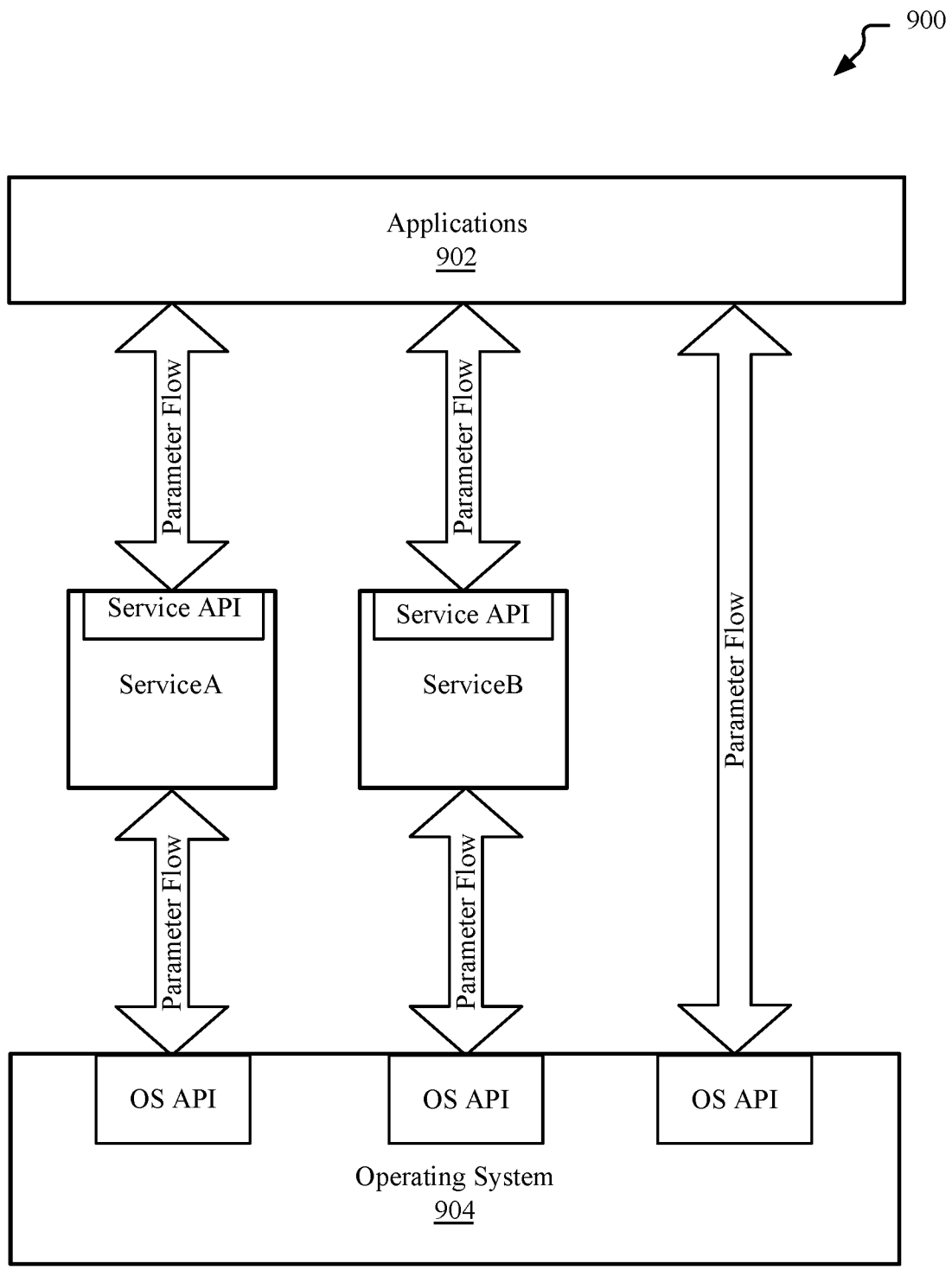
FIG. 9A-9B are block diagrams of exemplary API software stacks according to embodiments.
Figure 9B:
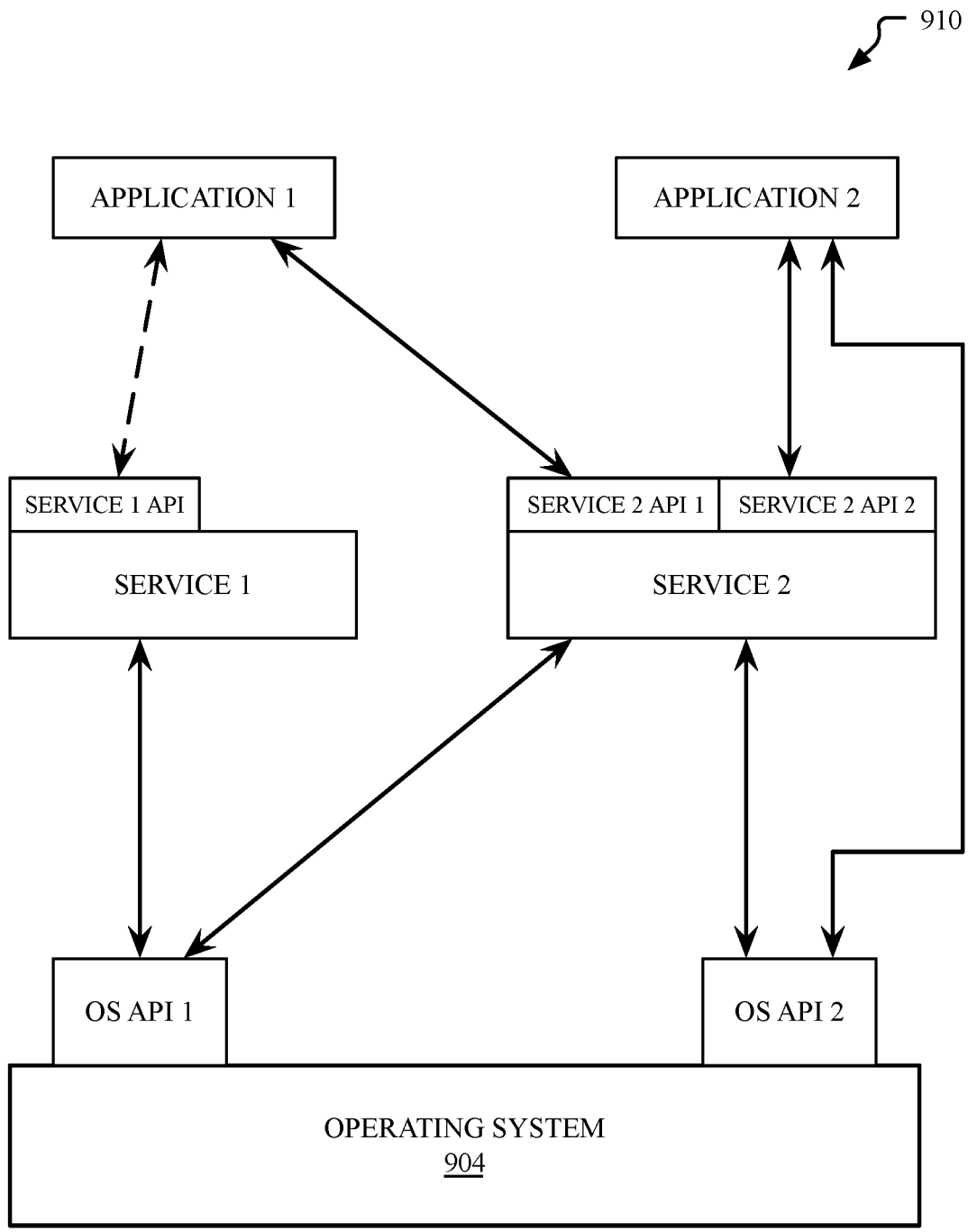

FIG. 9A-9B are block diagrams of exemplary API software stacks 900, 910, according to embodiments. FIG. 9A shows an exemplary API software stack 900 in which applications 902 can make calls to Service A or Service B using Service API and to Operating System 904 using an OS API. Additionally, Service A and Service B can make calls to Operating System 904 using several OS APIs.

FIG. 9B shows an exemplary API software stack 910 including Application 1, Application 2, Service 1, Service 2, and Operating System 904. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

In one embodiment, the authorization module 405 described herein can limit the types of interactions that applications can have with services. For example, in one embodiment Application 1 is an application that has been granted authorization to receive locations at coarse granularity and service 1 is a location services framework. The authorization module can limit the temporal and spatial resolution of the device location that is provided to application 1.

Figure 10:
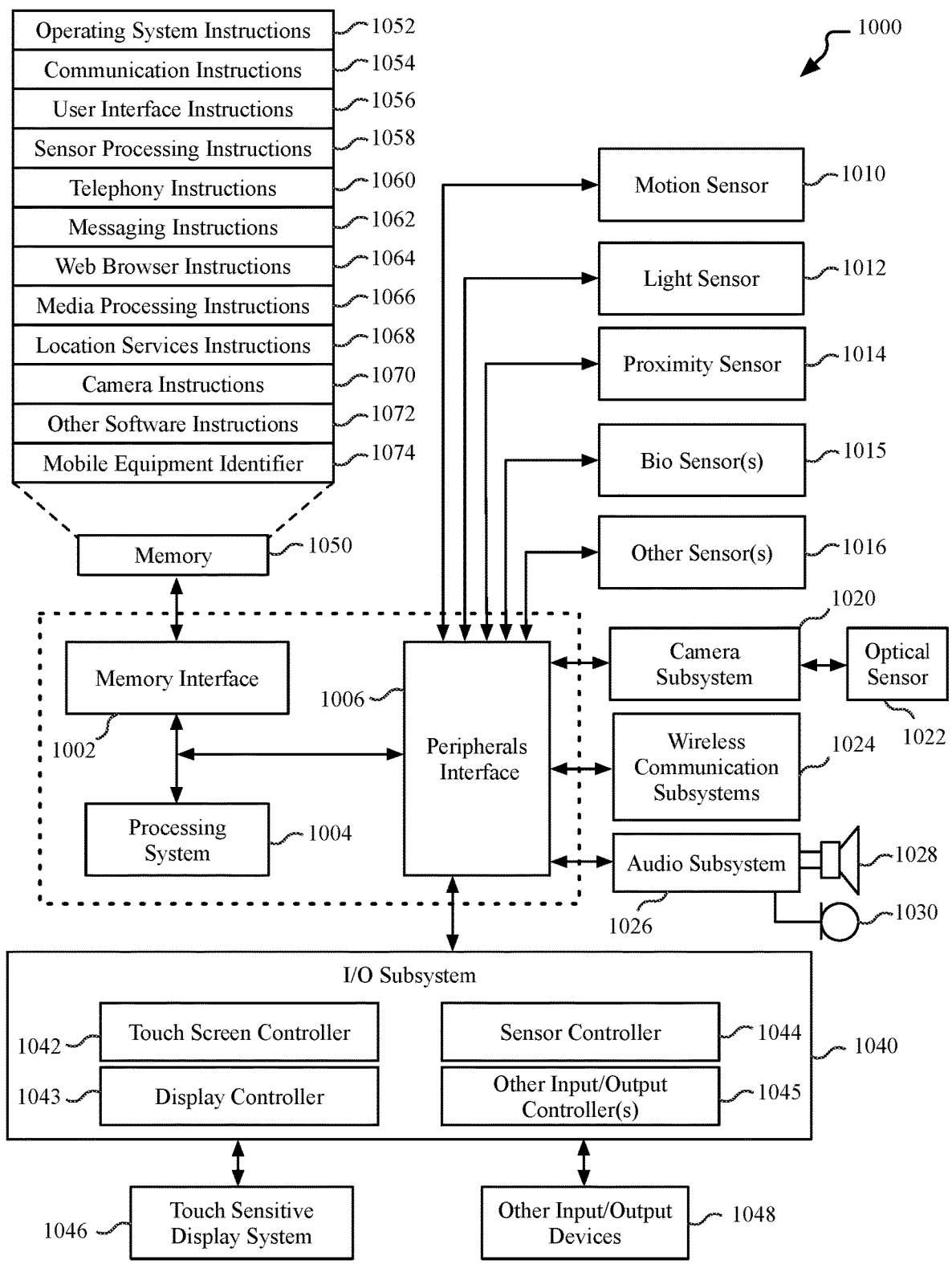
FIG. 10 is a block diagram of a device architecture for a mobile or embedded device, according to an embodiment.

FIG. 10 is a block diagram of a device architecture 1000 for a mobile or embedded device, according to an embodiment. The device architecture 1000 includes a memory interface 1002, a processing system 1004 including one or more data processors, image processors and/or graphics processing units, and a peripherals interface 1006. The various components can be coupled by one or more communication buses or signal lines. The various components can be separate logical components or devices or can be integrated in one or more integrated circuits, such as in a system on a chip integrated circuit.

The memory interface 1002 can be coupled to memory 1050, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1006 to facilitate multiple functionalities. For example, a motion sensor 1010, a light sensor 1012, and a proximity sensor 1014 can be coupled to the peripherals interface 1006 to facilitate the mobile device functionality. One or more biometric sensor(s) 1015 may also be present, such as a fingerprint scanner for fingerprint recognition or an image sensor for facial recognition. Other sensors 1016 can also be connected to the peripherals interface 1006, such as a positioning system (e.g., GPS receiver), a temperature sensor, or other sensing device, to facilitate related functionalities. A camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1024, which can include radio frequency receivers and transmitters and/or optical (e.g., infrared) receivers and transmitters. The specific design and implementation of the wireless communication subsystems 1024 can depend on the communication network(s) over which a mobile device is intended to operate. For example, a mobile device including the illustrated device architecture 1000 can include wireless communication subsystems 1024 designed to operate over a GSM network, a CDMA network, an LTE network, a Wi-Fi network, a Bluetooth network, or any other wireless network. In particular, the wireless communication subsystems 1024 can provide a communications mechanism over which a media playback application can retrieve resources from a remote media server or scheduled events from a remote calendar or event server.

An audio subsystem 1026 can be coupled to a speaker 1028 and a microphone 1030 to facilitate voice-enabled functions, such as voice recognition, voice replication, digital recording, and telephony functions. In smart media devices described herein, the audio subsystem 1026 can be a high-quality audio system including support for virtual surround sound.

The I/O subsystem 1040 can include a touch screen controller 1042 and/or other input controller(s) 1045. For computing devices including a display device, the touch screen controller 1042 can be coupled to a touch sensitive display system 1046 (e.g., touch-screen). The touch sensitive display system 1046 and touch screen controller 1042 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1046. Display output for the touch sensitive display system 1046 can be generated by a display controller 1043. In one embodiment, the display controller 1043 can provide frame data to the touch sensitive display system 1046 at a variable frame rate.

In one embodiment, a sensor controller 1044 is included to monitor, control, and/or processes data received from one or more of the motion sensor 1010, light sensor 1012, proximity sensor 1014, or other sensors 1016. The sensor controller 1044 can include logic to interpret sensor data to determine the occurrence of one of more motion events or activities by analysis of the sensor data from the sensors. In one embodiment the sensor controller 1044 also manages the camera subsystem 1020 and audio subsystem 1026, which couple with the sensor controller 1044 via the peripherals interface 1006. Multimedia captured by the camera subsystem 1020 and/or audio subsystem 1026 may be relayed to the memory 1050 to be accessed by software executing on the processing system 1004, or processed by the sensor controller 1044 or other processors in the system to determine environmental metadata. In one embodiment, the sensor processor may configure a live audio stream to a hearing-aid device or wireless earbuds that are connected via a wireless processor, enabling the audio stream to bypass the processing system 1004 and memory 1050.

In one embodiment, the I/O subsystem 1040 includes other input controller(s) 1045 that can be coupled to other input/control devices 1048, such as one or more buttons, rocker switches, thumb-wheel, infrared port, USB port, and/or a pointer device such as a stylus, or control devices such as an up/down button for volume control of the speaker 1028 and/or the microphone 1030.

In one embodiment, the memory 1050 coupled to the memory interface 1002 can store instructions for an operating system 1052, including portable operating system interface (POSIX) compliant and non-compliant operating system or an embedded operating system. The operating system 1052 may include instructions for handling basic system services and for performing hardware dependent tasks. In some implementations, the operating system 1052 can be a kernel.

The memory 1050 can also store communication instructions 1054 to facilitate communicating with one or more additional devices, one or more computers and/or one or more servers, for example, to retrieve web resources from remote web servers. The memory 1050 can also include user interface instructions 1056, including graphical user interface instructions to facilitate graphic user interface processing.

Additionally, the memory 1050 can store sensor processing instructions 1058 to facilitate sensor-related processing and functions; telephony instructions 1060 to facilitate telephone-related processes and functions; messaging instructions 1062 to facilitate electronic-messaging related processes and functions; web browser instructions 1064 to facilitate web browsing-related processes and functions; media processing instructions 1066 to facilitate media processing-related processes and functions; location services instructions including GPS and/or navigation instructions 1068 and Wi-Fi based location instructions to facilitate location based functionality; camera instructions 1070 to facilitate camera-related processes and functions; and/or other software instructions 1072 to facilitate other processes and functions, e.g., security processes and functions, and processes and functions related to the systems. The memory 1050 may also store other software instructions such as web video instructions to facilitate web video-related processes and functions; and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. A mobile equipment identifier, such as an International Mobile Equipment Identity (IMEI) 1074 or a similar hardware identifier can also be stored in memory 1050.

Each of the above identified instructions and applications can correspond to a set of instructions for performing one or more functions described above. These instructions need not be implemented as separate software programs, procedures, or modules. The memory 1050 can include additional instructions or fewer instructions. Furthermore, various functions may be implemented in hardware and/or in software, including in one or more signal processing and/or application specific integrated circuits.

Figure 11:
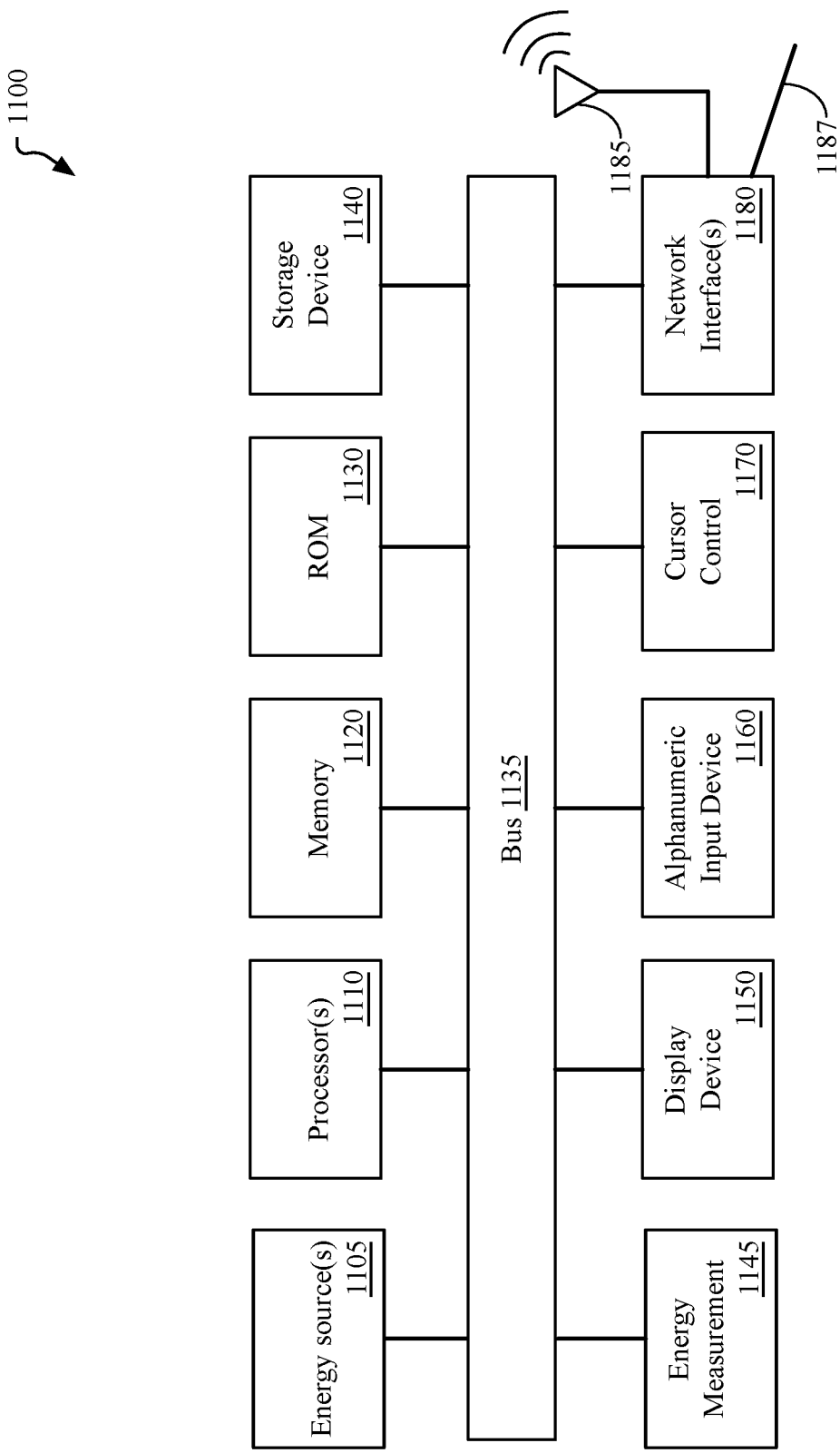
FIG. 11 is a block diagram of a computing system according to an embodiment.

FIG. 11 is a block diagram of a computing system 1100, according to an embodiment. The illustrated computing system 1100 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1100 can be used to provide the computing device and/or a server device to which the computing device may connect.

The computing system 1100 includes bus 1135 or other communication device to communicate information, and processor(s) 1110 coupled to bus 1135 that may process information. While the computing system 1100 is illustrated with a single processor, the computing system 1100 may include multiple processors and/or co-processors. The computing system 1100 further may include memory 1120, which can be random access memory (RAM) or other dynamic storage device coupled to the bus 1135. The memory 1120 may store information and instructions that may be executed by processor(s) 1110. The memory 1120 may also be used to store temporary variables or other intermediate information during execution of instructions by the processor(s) 1110.

The computing system 1100 may also include read only memory (ROM) 1130 and/or another data storage device 1140 coupled to the bus 1135 that may store information and instructions for the processor(s) 1110. The data storage device 1140 can be or include a variety of storage devices, such as a flash memory device, a magnetic disk, or an optical disc and may be coupled to computing system 1100 via the bus 1135 or via a remote peripheral interface.

The computing system 1100 may also be coupled, via the bus 1135, to a display device 1150 to display information to a user. The computing system 1100 can also include an alphanumeric input device 1160, including alphanumeric and other keys, which may be coupled to bus 1135 to communicate information and command selections to processor(s) 1110. Another type of user input device includes a cursor control 1170 device, such as a touchpad, a mouse, a trackball, or cursor direction keys to communicate direction information and command selections to processor(s) 1110 and to control cursor movement on the display device 1150. The computing system 1100 may also receive user input from a remote device that is communicatively coupled via one or more network interface(s) 1180.

The computing system 1100 further may include one or more network interface(s) 1180 to provide access to a network, such as a local area network. The network interface(s) 1180 may include, for example, a wireless network interface having antenna 1185, which may represent one or more antenna(e). The computing system 1100 can include multiple wireless network interfaces such as a combination of Wi-Fi, Bluetooth®, near field communication (NFC), and/or cellular telephony interfaces. The network interface(s) 1180 may also include, for example, a wired network interface to communicate with remote devices via network cable 1187, which may be, for example, an Ethernet cable, a coaxial cable, a fiber optic cable, a serial cable, or a parallel cable.

In one embodiment, the network interface(s) 1180 may provide access to a local area network, for example, by conforming to IEEE 802.3 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1180 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1100 can further include one or more energy sources 1105 and one or more energy measurement systems 1145. Energy sources 1105 can include an AC/DC adapter coupled to an external power source, one or more batteries, one or more charge storage devices, a USB charger, or other energy source. Energy measurement systems include at least one voltage or amperage measuring device that can measure energy consumed by the computing system 1100 during a predetermined period of time. Additionally, one or more energy measurement systems can be included that measure, e.g., energy consumed by a display device, cooling subsystem, Wi-Fi subsystem, or other frequently used or high-energy consumption subsystem.

As described above, one aspect of the present technology is the gathering and use of data available from specific and legitimate sources to improve user experience with respect to granting access to protected resources on a data processing system. The present disclosure contemplates that in some instances, this gathered data may include personal information data regarding application usage patterns for a user. The gathering of such application usage patterns may also inadvertently reveal other information that may be used to uniquely identify the user, such as demographic data, location-based data, online identifiers, telephone numbers, email addresses, home addresses, data or records relating to a user's health or level of fitness (e.g., vital signs measurements, medication information, exercise information), date of birth, or any other personal information. The present disclosure recognizes that the use of such personal information data, in the present technology, can be used to the benefit of users, for example, to improve the user experience with performing tasks using a data processing system or computing device described herein.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during system configuration or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

In embodiments described herein, a location control subsystem is provided that allows a user of a mobile device to define the granularity used to provide location coarseness. A user can define a coarse location granularity for an application. When a coarse device location is reported to an application, the location can be provided with at least a minimum degree of variable specificity based on the selected location coarseness. When an application is granted a coarse location, the application is to interpret the provided location indicating that the user may be anywhere within a geographic region of variable specificity, as opposed to being close to a center point with a horizontal accuracy based on the precision of the location fix, as when a fine granularity location is provided. In addition to reducing the spatial resolution of the location that is reported to the application, the temporal resolution may also be reduced.

One embodiment provides for a data processing system on a mobile electronic device, the system comprising a display device to display a user interface, a location determination subsystem, a memory device, and one or more processors coupled with the memory device, the location determination subsystem, and the display device. The one or more processors are configured to execute instructions. The instructions can cause the one or more processors to receive a location request from an application executed by the one or more processors, determine that the application is authorized to receive a location at a coarse location granularity, determine a location for the mobile electronic device, adjust the location for the mobile electronic device to reduce the spatial resolution of the location, and provide the adjusted location to the application in response to the location request. The location determination subsystem includes a receiver for a satellite-based location estimation system and the location may be determined at least in part via a signal received via the receiver for the satellite-based location estimation system.

In a further embodiment, the one or more processors can be configured to receive a request from the application to increase the spatial resolution of the location to be provided to the application during an activity to be performed by the application, cause a prompt to be displayed via the user interface to approve the request to increase the spatial resolution of the location, and in response to receipt of approval of the request, provide the location to the application at increased spatial resolution until conclusion of the activity. The one or more processors can also receive a request via the user interface to initiate an activity via the application, the activity to make use of a location having an increased spatial resolution and automatically increase the spatial resolution of the location provided to the application until conclusion of the activity. In one embodiment the application is a map application and the activity to make use of the location having the increased spatial resolution is a turn-by-turn navigation session. In one embodiment, to adjust the location for the mobile electronic device to reduce the spatial resolution of the location includes to determine a geographic grid cell associated with the location of the mobile electronic device and adjust the location for the mobile electronic device to a center point of the geographic grid cell. In one embodiment, to adjust the location for the mobile electronic device to reduce the spatial resolution of the location includes to determine a geographic grid cell associated with the location of the mobile electronic device, determine a geographic grid supercell that includes the geographic grid cell, and adjust the location for the mobile electronic device to a representative location of the geographic grid supercell.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A data processing system on an electronic device, the system comprising:
 a display device to display a user interface;
 a location determination subsystem;
 a memory device; and
 one or more processors coupled with the memory device, the location determination subsystem, and the display device, the one or more processors to execute instructions, wherein the instructions cause the one or more processors to:
  receive a location request from an application executed by the one or more processors;
  determine that the application is authorized to receive a location at a coarse location granularity;
  determine a location for the electronic device;
  adjust the location for the electronic device to reduce a spatial resolution of the location;
  provide an adjusted location to the application in response to the location request;
  receive a request from the application to increase the spatial resolution of the location provided to the application; and
  in response to receipt of user approval of the request, provide the location to the application at an increased spatial resolution.

2. The data processing system as in claim 1, the one or more processors further to:
 store the adjusted location to the memory device;
 provide the adjusted location in response to a subsequent location request from the application; and
 update the adjusted location stored to the memory device after a pre-determined period of time and after the electronic device has moved at least a threshold distance.

3. The data processing system as in claim 1, the one or more processors further to:
 cause a prompt to be displayed via the user interface to approve the request to increase the spatial resolution of the location.

4. The data processing system as in claim 1, the one or more processors further to:
 receive a request via an input device to initiate an activity via the application, the activity to make use of a location having an increased spatial resolution; and
 automatically increase the spatial resolution of the location provided to the application until conclusion of the activity.

5. The data processing system as in claim 4, wherein the application is a map application and the activity to make use of the location having the increased spatial resolution is a turn-by-turn navigation session.

6. The data processing system as in claim 1, wherein to adjust the location for the electronic device to reduce the spatial resolution of the location includes to:
 determine a geographic grid cell associated with the location of the electronic device; and
 adjust the location for the electronic device to a center of the geographic grid cell.

7. The data processing system as in claim 1, wherein to adjust the location for the electronic device to reduce the spatial resolution of the location includes to:
 determine a geographic grid cell associated with the location of the electronic device;
 determine a geographic grid supercell that includes the geographic grid cell; and
 adjust the location for the electronic device to a representative location of the geographic grid supercell.

8. The data processing system as in claim 1, wherein the location determination subsystem includes a receiver for a satellite-based location estimation system and the location determined at least in part via a signal received via the receiver for the satellite-based location estimation system.

9. A method comprising:
 receiving, at a location determination subsystem of an electronic device, a location request from an application executed by one or more processors of the electronic device;
 determining that the application is authorized to receive a location at a coarse location granularity;
 determining the location for the electronic device via a location determination system of the electronic device;
 adjusting the location for the electronic device to reduce a spatial resolution of the location by adjusting the location to a center of a geographic grid cell associated with the location of the electronic device; and
 providing an adjusted location to the application in response to the location request.

10. The method as in claim 9, further comprising:
 storing the adjusted location to a memory of the electronic device;
 providing the adjusted location in response to a subsequent location request from the application; and
 updating the adjusted location stored to the memory after a pre-determined period of time and after the electronic device has moved at least a threshold distance.

11. The method as in claim 9, further comprising:
 receiving a request from the application to increase the spatial resolution of the location to be provided to the application during an activity to be performed by the application;
 causing a prompt to be displayed via a user interface to approve the request to increase the spatial resolution of the location; and
 in response to receipt of approval of the request, providing the location to the application at increased spatial resolution until conclusion of the activity.

12. The method as in claim 9, further comprising:
 receiving a request via an input device to initiate an activity via the application, the activity to make use of a location having an increased spatial resolution; and
 automatically increasing the spatial resolution of the location provided to the application until conclusion of the activity.

13. The method as in claim 12, wherein the application is a map application and the activity to make use of the location having the increased spatial resolution is a turn-by-turn navigation session.

14. The method as in claim 9, wherein adjusting the location for the electronic device to reduce the spatial resolution of the location includes:
 determining the geographic grid cell associated with the location of the electronic device.

15. The method as in claim 9, wherein adjusting the location for the electronic device to reduce the spatial resolution of the location includes:

determining a geographic grid cell associated with the location of the electronic device;

determining a geographic grid supercell that includes the geographic grid cell; and adjusting the location for the electronic device to a representative location of the geographic grid supercell.

16. The method as in claim 9, further comprising determining the location at least in part via a satellite-based location estimation system.

17. A non-transitory machine-readable medium having instructions stored thereon, wherein the instructions cause one or more processors of an electronic device to perform operations comprising:

receiving, at a location determination subsystem of an electronic device, a location request from an application executed by one or more processors of the electronic device;

determining that the application is authorized to receive a location at a coarse location granularity;

determining the location for the electronic device via a location determination system of the electronic device;

adjusting the location for the electronic device to reduce a spatial resolution of the location;

providing an adjusted location to the application in response to the location request;

receiving a request to initiate an activity via the application, the activity to utilize an increased spatial resolution of the location; and automatically increasing the spatial resolution of the location provided to the application during the activity.

18. The non-transitory machine-readable medium as in claim 17, the operations further comprising:

storing the adjusted location to a memory of the electronic device;

providing the adjusted location in response to a subsequent location request from the application; and updating the adjusted location stored to the memory after a pre-determined period of time and after the electronic device has moved at least a threshold distance.

19. The non-transitory machine-readable medium as in claim 18, wherein the request is received via an input device.

20. The non-transitory machine-readable medium as in claim 19, the operations further comprising determining the location at least in part via a satellite-based location estimation system.

21. A device comprising:

a memory; and at least one processor configured to:

transmit, by an application and to a location service executing on the device, a request for a location of the device;

receive, by the application and from the location service, a coarse location of the device;

transmit, by the application and to the location service, a request to increase the spatial resolution of the coarse location; and responsive to the request, receive, by the application and from the location service, a fine location of the device.

22. A non-transitory machine-readable medium having instructions stored thereon, wherein the instructions cause one or more processors of an electronic device to perform operations comprising:

transmitting, by an application and to a location service executing on the electronic device, a request for a location of the electronic device;

receiving, by the application and from the location service, a coarse location of the electronic device;

transmitting, by the application and to the location service, a request to increase the spatial resolution of the coarse location; and responsive to the request, receiving, by the application and from the location service, a fine location of the electronic device.

* * * * *